United States Patent
Schjerven, Jr.

[15] 3,696,928
[45] Oct. 10, 1972

[54] METHOD OF RECOVERING SOLID PARTICULATE MATERIAL FROM A LIQUID

[72] Inventor: William N. Schjerven, Jr., Bellwood, Ill.

[73] Assignee: Western Electric Company, Incorporated, New York, N.Y.

[22] Filed: Dec. 28, 1970

[21] Appl. No.: 101,939

[52] U.S. Cl. .................................210/75, 210/500
[51] Int. Cl. .............................................B01d 37/02
[58] Field of Search....................210/65, 73, 75, 500

[56] References Cited

UNITED STATES PATENTS

| | | | |
|---|---|---|---|
| 2,822,091 | 2/1958 | Martine, Jr. | 210/75 |
| 3,279,603 | 10/1966 | Busse | 210/75 X |
| 2,831,578 | 4/1958 | Schwinn | 210/65 |
| 3,346,418 | 10/1967 | Chapman et al. | 210/75 X |
| 3,325,008 | 6/1967 | Lancy | 210/73 |

*Primary Examiner*—John Adee
*Attorney*—W. M. Kain, R. P. Miller and A. C. Schwarz, Jr.

[57] ABSTRACT

In recovering copper solid particulate material from a rinse water, a filter aid in the form of a relatively thin layer of the solid particulate material is initially formed on a portion of an indexable filter media. This is accomplished by combining solid particulate material of the type which is to be recovered, with water, to produce a relatively thick slurry. This slurry is passed through the filter media and the material which filters out is subsequently leveled to a predetermined uniform depth to form the filter aid layer or bed. The rinse water then is passed through the filter aid and the underlying portion of the filter media, which cooperate to remove solid particulate material from the rinse water. Subsequently, as the filter media is indexed, a filter aid layer is formed on succeeding portions thereof and the filtered solid particulate material and the solid particulate material forming its associated filter aid layer are removed therefrom. After removal of the solid particulate material from the filter media, the media may be incinerated to recover any particulate material embedded therein or adhering thereto.

5 Claims, 7 Drawing Figures

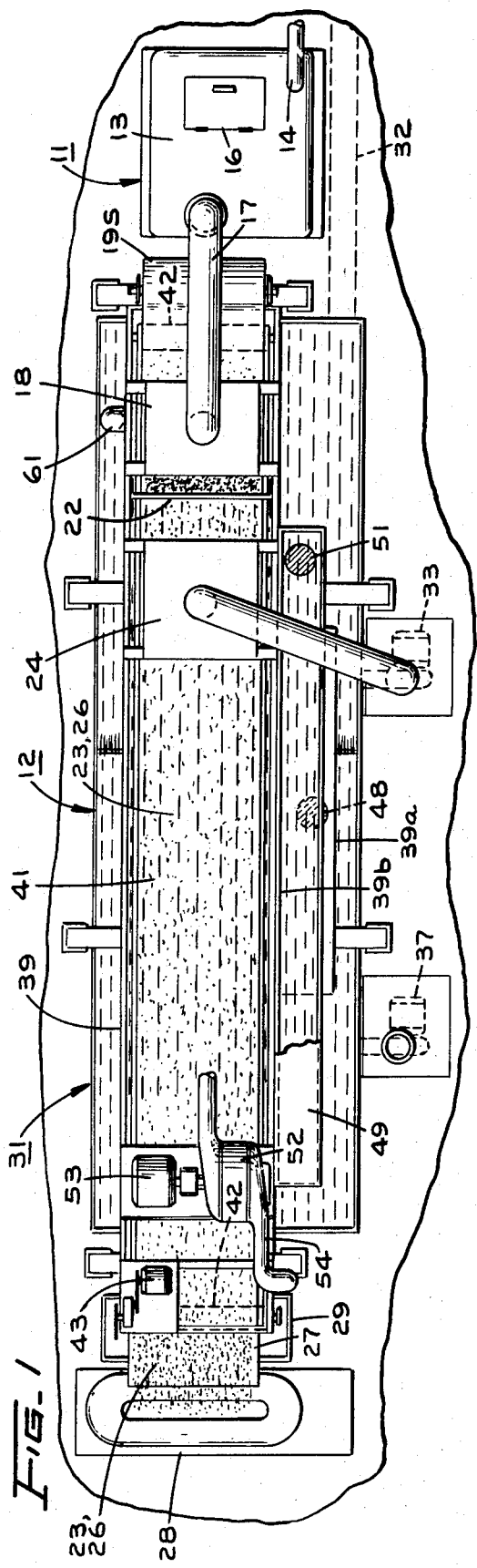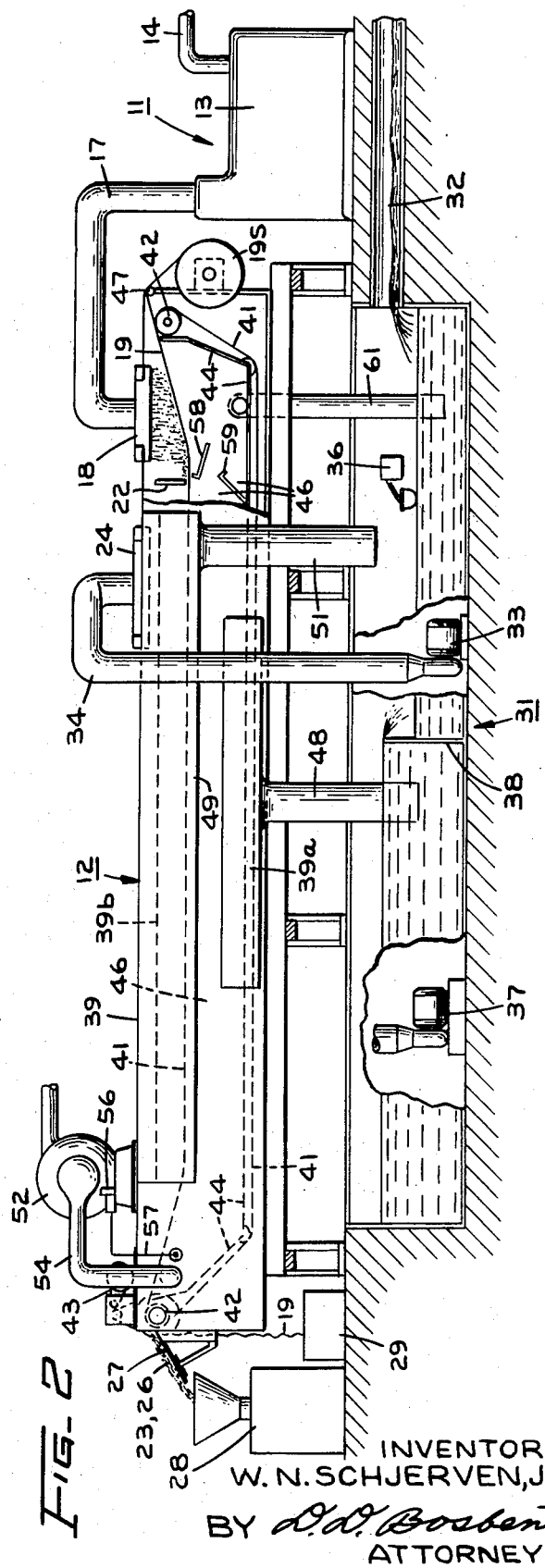

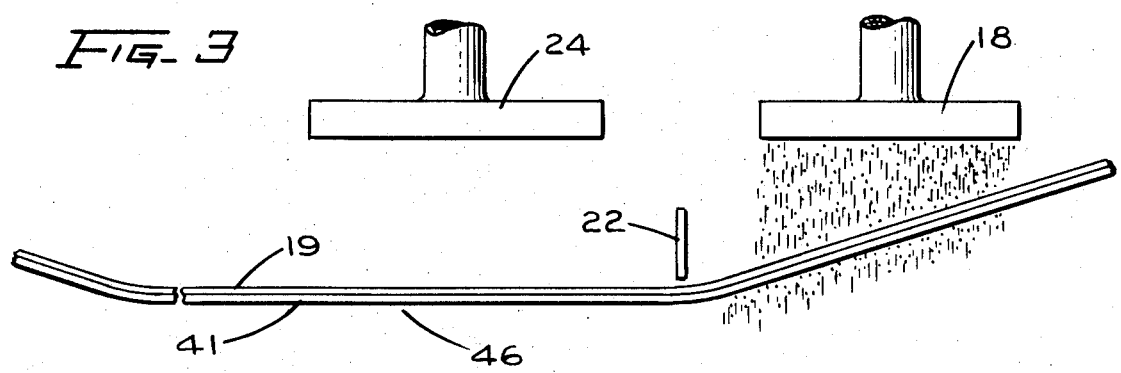
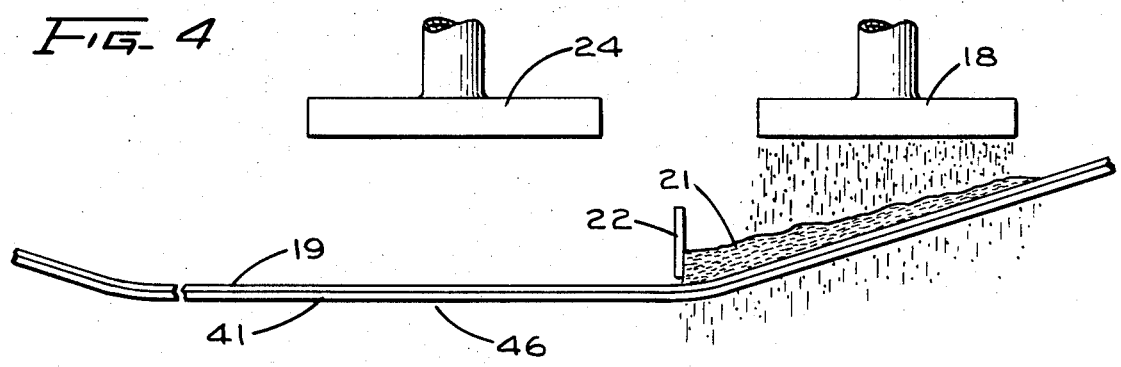
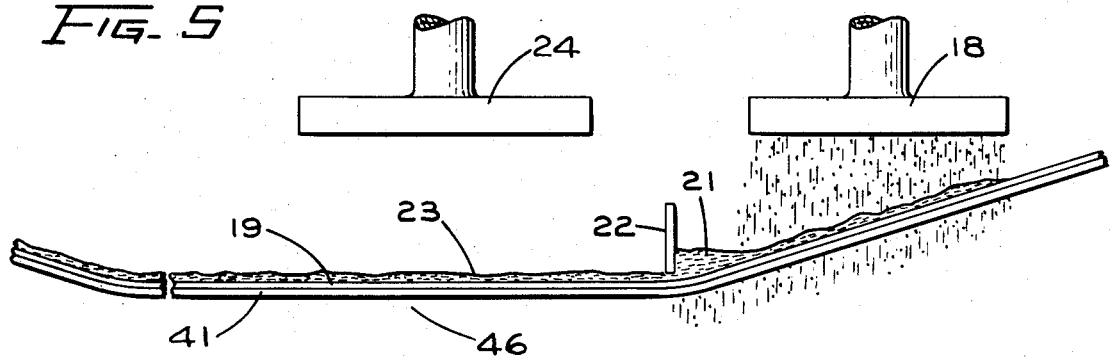
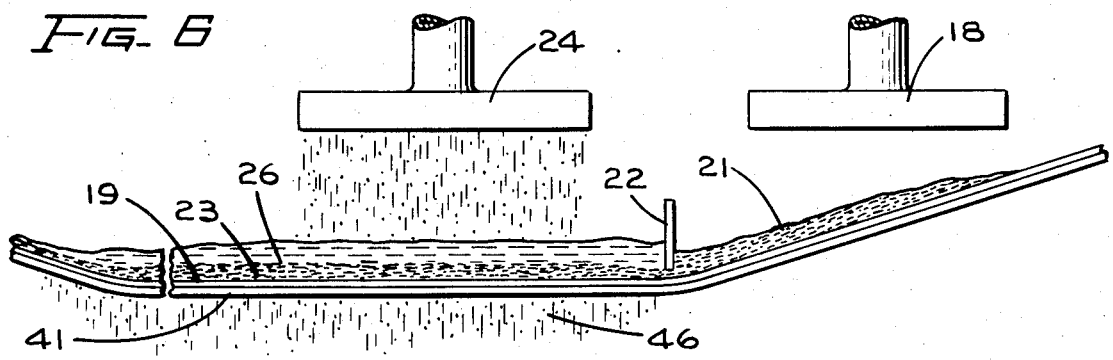

METHOD OF RECOVERING SOLID PARTICULATE MATERIAL FROM A LIQUID

BACKGROUND OF THE INVENTION

1. Field of the Invention

This invention relates to a method of recovering solid particulate material from a liquid, and more particularly to a method of recovering metallic solids from a neutralized metal processing solution, to make the solution suitable for reuse or for discharge into a sewer.

2. Description

In the manufacture of rolled copper rod which is to be drawn into electrical conductor wire, it is standard practice to dip the copper rod in a pickling solution, which includes sulphuric acid, certain other process enhancing agents and water, to remove copper oxides which have formed on the surface of the rod during its passage through a rolling mill. The rod subsequently is dipped in a series of water rinse tanks to remove acid solution remaining on the rod as a result of the pickling process, and finally in a neutralizing soap dip. Eventually, the water in the rinse tanks becomes contaminated with solid particulate material from the surface of the copper rod, which must be removed from the water before it can be reused in manufacturing operations or discharged into a sewer. In this regard, these copper solids usually are in the form of copper oxide particles (cupric and cuprous), pure copper fines and small amounts of copper hydroxide, with traces of copper sulphate in solution.

One well known procedure for removing the copper solids from the rinse water involves introducing the contaminated rinse water into a settling tank in which the copper solids settle to the bottom of the tank and in which, after a preselected period of time, the rinse water is withdrawn from the tank. In a specific known system of this type, the water, instead of being withdrawn from the tank, is permitted to seep out of the tank through pervious vertical side walls and through a filter bed.

In other known processes the effluent from a settling tank is passed through a relatively thick filter bed of a suitable filter material, such as dolomite. The filter material may be pretreated so as to react chemically with any suspended or colloidally dissolved copper salts in the water, so as to remove these contaminants from the water. When the filter bed becomes clogged, it is backwashed to remove the copper contaminants therefrom, and the backwash water and the copper contaminants are returned to the settling tank for resettling.

One disadvantage of these prior known systems is that the recovery process generally is relatively time consuming. Further, settling tank systems require a large amount of space and settling tank systems in which the water is withdrawn after a predetermined settling time, without further treatment, are not particularly suited for the recovery of small solid particles and fines, because of the tendency for these materials to remain in suspension. In addition, however, systems in which the water subsequently passes through a filter bed also are disadvantageous in that usually a relatively large amount of filtering material is required, there is a tendency for the filter bed to become clogged rapidly when there are a large number of fines and colloidal suspensions in the water, and it is necessary to take the filter bed out of operation periodically when backwashing is required.

Filtration processes and equipment for removing the copper solids from the rinse water also are known in which a filter aid, in the form of a 2 to 3 inch layer of a filtering material, such as diatomaceous earth, is deposited on a unitary supporting filter media, such as an indexable invention; of filter paper. The rinse water, after strip acidity has been neutralized, then is passed through the diatomaceous earth and the filter paper, which cooperate to filter out the copper solids. This filtering process is assisted by providing a vacuum beneath the filter paper, and when the diatomaceous earth and the filter paper become clogged with solid particulate material such that the vacuum increases to a preselected value, a new portion of the paper is automatically indexed into filtering position and a filter aid bed of the diatomaceous earth is formed on the new portion of the paper. The clogged diatomaceous earth and filter paper subsequently may be collected in the same container for disposal, or the diatomaceous earth may be removed from the filter paper, in which case they are collected in separate containers for disposal.

This last mentioned system also is disadvantageous, however, for several reasons. For example, while the copper solids have been removed from the neutralized rinse water, whereby it can be reused in manufacturing operations or discharged into a sewer, the clogged diatomaceous earth and the paper filter media still must be disposed of in a suitable manner, such as by hauling them to a land fill area. Another disadvantage of the system is that there is no practical procedure from an economic standpoint for recovering the copper solids from the diatomaceous earth and reusing the solids in manufacturing and they must be discarded with the diatomaceous earth as a sludge or "soft scrap."

SUMMARY OF THE INVENTION

An object of this invention is to provide a new and improved method of recovering solid particulate material from a liquid.

Another object of this invention is to provide a new and improved method of recovering solid particulate material from a liquid in which a relatively high volume of liquid per unit of time can be processed in comparison to prior known methods.

A further object of this invention is to provide a new and improved method of the type in which solid particulate material is removed from a liquid by passing the liquid through a filter aid layer of filtering material on a supporting filter media, wherein the problem of disposing of clogged filter aid material is eliminated.

A still further object of this invention is to provide a new and improved method of the type in which solid particulate material is removed from a liquid by passing the liquid through a filter aid layer of filtering material on a supporting filter media, wherein the solid particulate material is removed from the liquid in a readily usable form.

In accordance with the invention, in a method of recovering solid particulate material from a liquid, a filter aid in the form of a relatively thin layer of solid particulate material of the same type as the solid particulate material to be recovered from the liquid, is formed on a unitary filter media. The liquid is then passed through this filter aid and the filter media, which cooperate to remove solid particulate material from the liquid. Subsequently, the filtered solid particulate material and the solid particulate material forming the filter aid are removed from the filter media.

More specifically, solid particulate material of the type to be removed from the liquid initially is mixed with a volume of the same type of liquid to form a relatively thick slurry. The slurry then is passed through the filter media and the material which is filtered out is leveled to a uniform depth on the order of one-sixteenth to one-eighth of an inch to form a filter aid on the filter media. After the initial operating cycle has been completed, a portion of the solid particulate material which has been removed from the filter media may be recycled through the process and used to make the slurry for forming the filter aid. Further, after removal of the solid particulate material from the filter media, the media may be incinerated to recover any particulate material embedded therein or adhering thereto.

BRIEF DESCRIPTION

FIG. 1 is a plan view of apparatus for use in practicing the method of the invention;

FIG. 2 is an elevational view of the apparatus shown in FIG. 1;

FIGS. 3, 4, 5 and 6 are schematic diagrams illustrating successive steps involved in practicing the method on the invention with the apparatus shown in FIGS. 1 and 2; and FIG. 7 is a photomicrograph of solid particulate material which can be removed from a liquid utilizing the method of the invention.

DETAILED DESCRIPTION

Referring to FIG. 7, the disclosed embodiment of the invention relates to the recovery of copper particulate material or solids 10 from water which has been used to rinse pickling solution from rolled copper rod (not shown) prior to the copper rod being drawn into electrical conductor wire. In this connection, the copper rod, after being dipped in a pickling solution, which includes sulphuric acid, certain other process enhancing agents and water, is dipped successively in a series of rinse tanks (not shown) before being subjected to a wire drawing operation. Periodically, as the water rinse tanks become contaminated with the copper solids 10, alkaline water is added to the rinse water to neutralize its acidity, preferably to a neutral to slightly alkaline condition, to reduce any copper in solution (in the form of copper sulfate) to a concentration of less than of the copper parts per million. The alkaline water for this purpose may be ordinary tap water, have a rough the blowdown water from cooling towers for an associated rod rolling mill. The tanks then are drained and the copper solids 10 are removed from the neutralized water so that it can be reused or discharged into a sewer, and so that the copper solids can be reused in manufacturing operations or used for other purposes.

This invention is based on the principle of utilizing the copper solids 10 to be recovered from the rinse water as their own filtering material, in cooperation with a supporting filter media. In this regard, for best results it is preferable that the particle sizes c. ring means mounted in said groove and operable to prevent said solids 10 have a relatively wide range, and that at least the larger particles 3. The telescopic gunsight of claim 2, wherein said ring means geometrical shape, whereby the rinse water being filtered can pass through the openings between the particles, but with the smaller particles becoming trapped by the larger particles. For example, in the photomicrograph in FIG. 7, which shows copper solids or particles 10 which were recovered from a laboratory sample of rinse water and then magnified 2,000 times, it is apparent that the particles, when grouped together in a mass, will form a layer of material having a plurality of irregular openings therebetween. It also can be seen that some of the smaller particles 10a have been trapped on surfaces of the larger particles 10b, and in some instances some of the smaller particles actually appear to be "clinging" to the larger particles. While the exact reason for this "clinging" phenomenon is not understood, it is believed that it may be due to minute electrostatic charges of opposite sign on the surfaces of the particles 10a and 10b, and it is considered to be of significant importance from the standpoint of increasing the effectiveness of the filtration process.

Apparatus for practicing the invention may be of any suitable type, such as the model "VAC 200–D Vaccumatic Filter" of the Hoffman Air and Filtration Division of Clarkson Industries, of Syracuse, N.Y., which is disclosed schematically in FIGS. 1 and 2. This apparatus includes two basic parts, a precoating device 11 and a vacuum filtration unit 12. The precoating device includes a housing 13 which contains a power driven mixer and a pump, neither of which is shown, a water inlet pipe 14, a door 16 (FIG. 1) for charging the housing with filtering material, a pump outlet pipe 17 and a distributor head 18 mounted on the discharge end of the outlet pipe.

In accordance with this invention, copper particulate material which is of the same type as the material 10 which is to be recovered from the contaminated rinse water, initially is mixed with water in the precoating device 11 to form a relatively thick slurry. Referring to FIGS. 1, 2 and 3, the precoating device 11 then pumps the slurry to the distributor head 18, which is positioned above a portion of a suitable filter media 19, such as an indexable continuous strip of cellulose paper, in the vacuum filtration unit 12. As the water from the slurry passes through the filter media 19, a major portion of the copper particulate material in the slurry is filtered out and becomes deposited on the media in a layer 21, as is illustrated in FIG. 4. Subsequently, as the filter media 19 is periodically advanced to the left, as viewed in FIG. 5, the deposited copper particulate material 21 is leveled to a uniform depth by a blade member 22 of the vacuum filtration unit 12, to provide a relatively thin filter aid layer 23, preferably on the order of one-sixteenth to one-eighth of an inch in thickness, on the media. The contaminated rinse water then is sprayed from a distributor head 24 of the filtration unit 12 over the filter aid layer 23 and the filter media 19, whereby they cooperate to remove the copper solids 10 from the contaminated water, as indicated by the material layer 26 in FIG. 6. Ultimately, referring to FIGS. 1 and 2, the removed copper solids layer 26, together with the copper solids forming the filter aid layer 23, are scraped from the filter media 19 by a blade 27 in a container 28, with the filter media passing into a separate container 29.

The vacuum filtration unit 12 includes a dual reservoir 31, one side of which is designed to receive contaminated rinse water through an inlet pipe 32. A pump 33 has an inlet connected to the contaminated water side of the water reservoir 31 and an outlet connected to a riser pipe 34, on which the filtration unit distributor head 24 is mounted. The water level in the contaminated water side of the reservoir 31 is regulated by a suitable float device 36 which is connected to control the flow of water into the reservoir from the inlet pipe 32 in a well known manner.

The other side of the dual reservoir 31 receives filtered clean water after it has passed through the filtration process in a manner to be described, and is connected to a pump 37 for discharging the clean water through suitable piping for reuse in manufacturing operations or to a sewer. As is best shown in FIG. 2, the two sides of the reservoir 31 are separated by a vertically extending wall 38, over the top of which excess water in the clean water side of the reservoir may flow back into the contaminated water side of the reservoir.

Above the dual reservoir 31, a tank 39 is mounted on a suitable framework. A continuous mesh belt 41, made of an inert material such as stainless steel, is supported in the tank on rollers 42 adjacent the opposite upper ends of the tank, with the belt and the rollers being suitably meshed with one another so as to preclude relative movement therebetween. The roller 42 at the upper left hand side of the tank 39, as viewed in FIG. 2, is driven by a motor 43 mounted on top of the tank, for intermittently advancing the belt 41 counterclockwise in this figure. The lower pass of the belt 41 travels beneath a plurality of transversely extending plate members 44 which are secured to opposite side walls of the tank 39 to form a bottom and opposite ends of a vacuum chamber 46, the sides of the chamber being formed by the tank side walls.

A supply roll 19S of the filter media 19 is suitably mounted on one end wall of the tank 39 with the filter media extending upward from the supply roll and over a guide roller 47 at the tank's adjacent upper corner. Intermediate the ends of the tank 39, the filter media 19 is supported on the upper pass of the mesh belt 41. In operation, the filter media 19 is retained in engagement with the belt 41 so as to be advanced thereby, by the weight of the copper solids 21, 23, 26 on the media and by the vacuum in the vacuum chamber 46.

Referring to FIGS. 5 and 6, as the contaminated water from the distributor head 24 is filtered by its passage through the filter aid layer 23 and the underlying portion of the filter media 19, the thus produced clean effluent passes into the vacuum chamber 46. Referring to FIGS. 1 and 2, this effluent then flows from the vacuum chamber 46 into a lateral extension 39a of the tank 39 and through a vertical drain pipe 48 to the clean water side of the dual reservoir 31. If the level of the contaminated water above the filter aid layer 23 and the filter media 19 rises too high, the excess water flows over a depressed portion 39b (FIGS. 1 and 2) in one side wall of the tank 39 into a trough 49 mounted on the side wall, and then through a drain pipe 51 back to the contaminated side of the dual reservoir 31.

As viewed in FIGS. 1 and 2, a vacuum producing device 52 and an associated drive motor 53 are mounted on top of the tank 39 adjacent its left hand end. The vacuum producing device 52 is connected to the vacuum chamber 46 by a suitable conduit 54 and a vacuum sensing switch 56 is connected to the vacuum chamber by a pipe line 57. Thus, as the layer 26 of the copper solids 10 builds up on the filter aid layer 23 and the filter media 19, as illustrated in FIG. 6, the vacuum in the vacuum chamber 46 increases and when it reaches a preselected value the sensing switch 56 closes to actuate the drive motor 43 for the mesh belt 41. The belt 41 and the filter media 19 then are advanced counterclockwise in FIG. 2 and to the left in FIG. 5, causing a new portion of the media and a new filter aid layer 23 of copper solids to be brought into position in the filtration area for the distributor head 24, and causing a new portion of the media to be brought into position beneath the slurry distributor head 18, as is illustrated in FIG. 5. When the belt 41 and the filter media 19 have advanced sufficiently that the vacuum in the vacuum chamber 46 has dropped back to another preselected level, the sensing switch 56 opens to stop the advancement of the belt and the media.

Since the slurry water which drains through the filter media 19 in the formation of the material layer 21 (FIG. 4) is still relatively contaminated, referring to FIG. 2, an upper transversely extending diverting member 58 and a lower transversely extending dam 59 are mounted between the side walls of the tank 39 to confine the water from the slurry to the right hand portion of the vacuum chamber 46, as viewed in this figure. From this part of the vacuum chamber 46 the water drains into the contaminated water side of the dual reservoir 31 through a pipe 61 for subsequent filtration as above described.

SUMMARY

In practicing the disclosed embodiment of the invention, neutralized rinse water containing copper solids 10 (FIG. 7) to be recovered is introduced into the contaminated water side of the dual reservoir 31 through the inlet pipe 32, under the automatic control of the float device 36, and copper solids of the same type are mixed with water in the precoating device 11 to form a relatively thick slurry. Then, with the vacuum producer 52 energized and producing a vacuum in the vacuum chamber 46, the slurry is pumped by the precoating device 11 through the outlet pipe 17 to the distributor head 18 and is sprayed over the portion of the filter media 19 therebeneath. As the water from the slurry filters through the filter media 19, copper solids become deposited upon the media as illustrated by the material layer 21 in FIG. 4. The water from the slurry which passes through the filter media 19, being still relatively contaminated, is confined to the right hand end portion of the vacuum chamber 46, as viewed in FIGS. 1 and 2, by the diverting member 58 and the dam 59, and flows through the drain pipe 61 into the contaminated water side of the reservoir 31 for subsequent recirculation and filtration.

The motor 43 then is actuated to advance the mesh belt 41 counterclockwise in FIG. 2, thereby advancing the filter media 19 to the left in FIGS. 4 and 5. During this advancement, the blade 22 levels the layer 21 of copper solids to provide the initial relatively thin filter aid layer 23 on the filter media 19, as is illustrated in FIG. 5.

After the formation of the initial filter aid layer 23, the pump 33 is actuated to begin delivery of the contaminated rinse water from the reservoir 31 through the pipe 34 to the distributor head 24. As the contaminated water flows through the filter aid layer 23 and the filter media 19 into the vacuum chamber 46, the filter aid layer and the media cooperate to remove the copper solids 10 (FIG. 7) from the water as is illustrated by the material layer 26 in FIG. 6. During the filtration process, the filtered clean effluent flows from the vacuum chamber 46 into the lateral extension 39a of the tank 39 and through the drain pipe 48 into the clean water side of the dual reservoir 31, from which it is removed by the pump 37 for reuse or discharge into a sewer. If the level of the water above the filter aid layer 23 and the filter media 19 rises too high during the filtration process, the excess water flows over the depressed side portion 39b of the tank 39 into the trough 49 and through the drain pipe 51 back to the contaminated water side of the reservoir 31.

As the layer 26 of the copper solids 10 builds up on the filter aid layer 23 and the filter media 19, the vacuum in the vacuum chamber 46 increases and when it reaches a preselected value the vacuum sensing switch 56 closes to actuate the drive motor 43 for the roller 42. This causes the mesh belt 41 to be again advanced counterclockwise in FIG. 2, thereby advancing the filter media 19 and the material layers 23 and 26 to the left in FIGS. 5 and 6. During this advancement, as the filter media 19 passes over the driven roller 42 the material layers 23 and 26 are scraped from the media into the container 28 by the blade 27, with the media passing into the container 29. At the same time, the material layer 21 which has been building up on the filter media 19 as a result of the discharge from the slurry distributor head 18, is advanced with the media and leveled by the blade 22 to provide a new filter aid layer 23 in the filtration area for the distributor head 24, as is illustrated in FIG. 5. The vacuum in the vacuum chamber 46 also is progressively decreasing and when it reaches a lower preselected value the vacuum sensing switch 56 opens to turn off the advancing motor 43. The accumulation of another material layer 21 on the filter media 19 from the slurry distributor head 18, and the building up of another material layer 26 of the copper solids 10 on the new filter aid layer 23 and its underlying portion of the filter media, as a result of discharge from the filtration distributor head 24, then are repeated.

From the foregoing description, it is apparent that the material 23, 26 which is collected in the container 28 consists primarily of copper solids in various forms and that these solids readily can be subjected to a suitable reclamation process and reduced to pure copper, which then can be reused in manufacturing operations. In the alternative, the material 23, 26 can be used for other purposes, such as a bacterial control agent or as a pigment in certain marine paints. A portion of this material 23, 26 also can be recycled through the process as necessary and used to produce the slurry for forming the filter aid layer 23 on the filter media 19.

In addition, while the material 23, 26 removed by the scraper blade 27 constitutes the major portion of the copper solids which were on the filter media 19, by subjecting the filter media in the container 29 to a suitable incinerating process, any of the material 23, 26 embedded in the filter media or adhering thereto also can be recovered, if so desired. In the incinerating operation, since the filter media 19 is almost entirely cellulose, it will be reduced to carbon dioxide and water, thereby producing no significant fumes and only a small amount of ash, which can be readily disposed of.

What is claimed is:

1. The method of removing copper and copper compound particles in suspension from a liquid with a filter aid, which enables recovery of substantially all of the particles in the form of a mixture of copper and copper compounds which can be readily reduced to pure copper, which comprises:

mixing copper and copper compound particles of varying sizes and of the same general type as the copper and copper compound particles to be recovered from the liquid, with a volume of the same type of liquid, to produce a relatively thick slurry;

depositing the slurry on a unitary filter media which passes the liquid of the slurry therethrough and which is capable of removing at least some of the copper and copper compound particles from the slurry, to precoat the filter media with a relatively thin filter aid layer of the particles;

then passing the liquid containing the copper and copper compound particles in suspension through the filter aid of copper and copper compound particles and the unitary filter media so that the filter aid and the filter media cooperate to remove copper and copper compound particles from the liquid; and separating the combined mixture of copper and copper compound particles, consisting of the particles which have been removed from the liquid by the filter aid and the unitary filter media, and of the particles which form the filter aid, from the filter media.

2. The method as defined in claim 1, in which:

the filter aid layer of copper and copper compound particles is precoated on the unitary filter media to a thickness on the order of one-sixteenth to one-eighth of an inch.

3. The method of removing solids from a water suspension of the solids wherein the solids are copper and copper compound particles of such a size as to be suspended in the water, which comprises:

mixing copper particles with water to form a slurry, said copper particles being of a number of different sizes but being large enough to form a porous mass which allows water to drain therethrough;

depositing the slurry onto a unitary filter media to form a porous, filter aid layer of copper particles, with said particles being spaced apart to allow the water to drain therethrough and through the unitary filter media; and then passing the water suspension of copper and copper compound particles through the porous filter aid layer to trap certain of the suspended particles while other suspended particles cling to the copper particles of the porous filter aid layer.

4. The method as defined in claim 3, in which:

the slurry is deposited on the unitary filter media to build up a porous, filter aid layer having a thickness on the order of one-sixteenth to one-eighth of an inch.

5. The method as defined in claim 3, which comprises the further steps of:

recycling a portion of the original filter aid layer and a portion of the particles removed from the suspension to form a slurry containing particles of a number of different sizes but being large enough to form a porous mass which allows water to drain therethrough;

depositing the slurry on a clean section of the unitary filter media to form another porous filter aid layer; and then passing additional quantities of the water suspension of copper and copper compound particles through the porous, filter aid layer to remove the particles from the suspension.

* * * * *